United States Patent [19]

Yellin

[11] Patent Number: 4,624,239
[45] Date of Patent: Nov. 25, 1986

[54] BARBECUE GRILL DAMPER-ASH RAKE

[76] Inventor: Bernard Yellin, 6 Oak Brook Club Dr., Oak Brook, Ill. 60521

[21] Appl. No.: 804,446

[22] Filed: Dec. 4, 1985

[51] Int. Cl.$^4$ .......................... A47J 37/00; F24B 3/00
[52] U.S. Cl. ................................. 126/25 R; 126/245; 126/285 A; 126/160
[58] Field of Search ................. 126/25 R, 9 A, 25 A, 126/25 C, 25 B, 25 AA, 146, 9 R, 285 R, 290, 285 A, 292, 160, 245, 289, 243, 242; 98/41.3; 251/304; 137/625.31

[56] References Cited

U.S. PATENT DOCUMENTS

| | | | |
|---|---|---|---|
| 1,739,678 | 12/1929 | Klein | 137/625.31 |
| 2,994,344 | 8/1961 | Kerley | 251/304 |
| 3,126,881 | 3/1964 | Blotsky, Jr. | 126/245 |
| 4,416,248 | 11/1983 | Schlosser | 126/9 B |

FOREIGN PATENT DOCUMENTS 2125160  2/1984  United Kingdom ................. 126/77

Primary Examiner—James C. Yeung
Attorney, Agent, or Firm—David D. Kaufman

[57] ABSTRACT

A combination damper and ash rake for a barbecue grill comprising an integral, flat disc having damper openings, rake projections struck upwardly from the disc and a pair of ears struck downwardly from the disc. The disc cooperates rotatably with a complementary flat bottom section of a barbecue grill receptacle having air openings formed therein. The disc ears provide a mounting hub for the disc positionable through a central mounting opening in the flat bottom section, and an operating handle is positionable through the disc ears. A resilient connector unites the handle and disc in operational assembly and provides a bias to maintain the disc in close contact with the bottom section of the grill receptacle.

5 Claims, 6 Drawing Figures

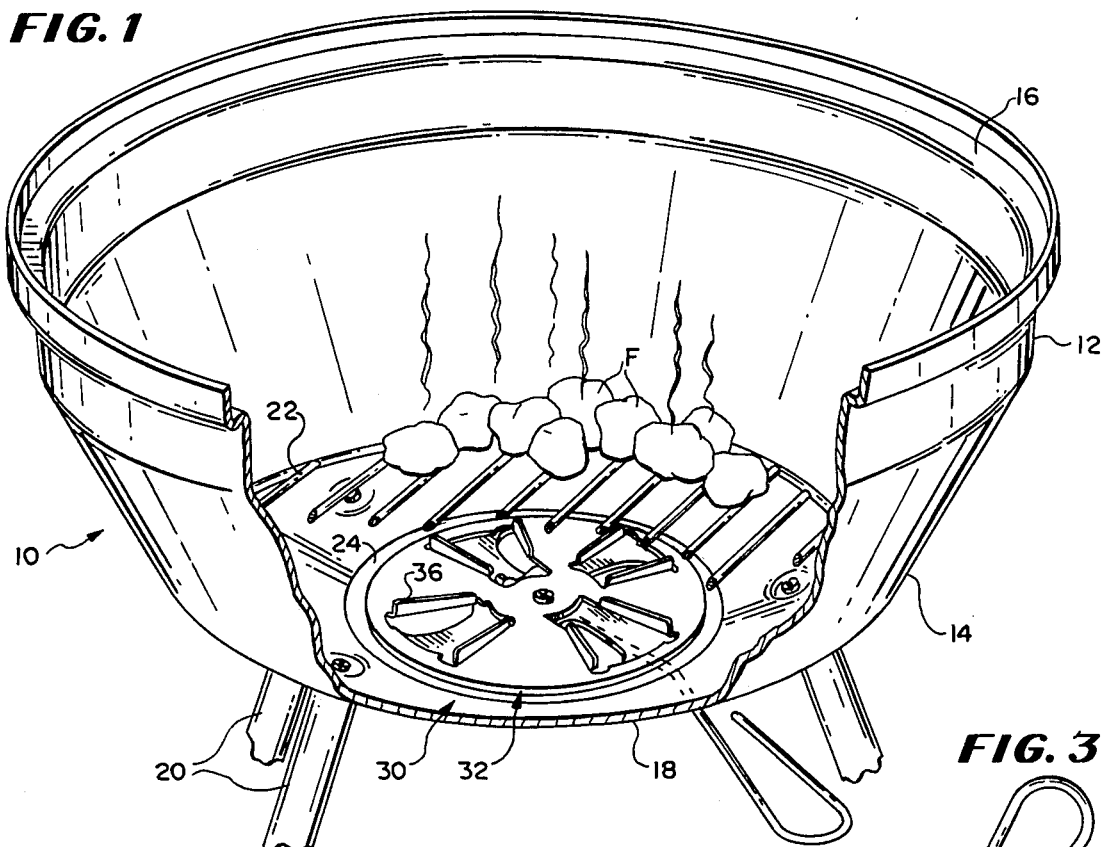
FIG. 1
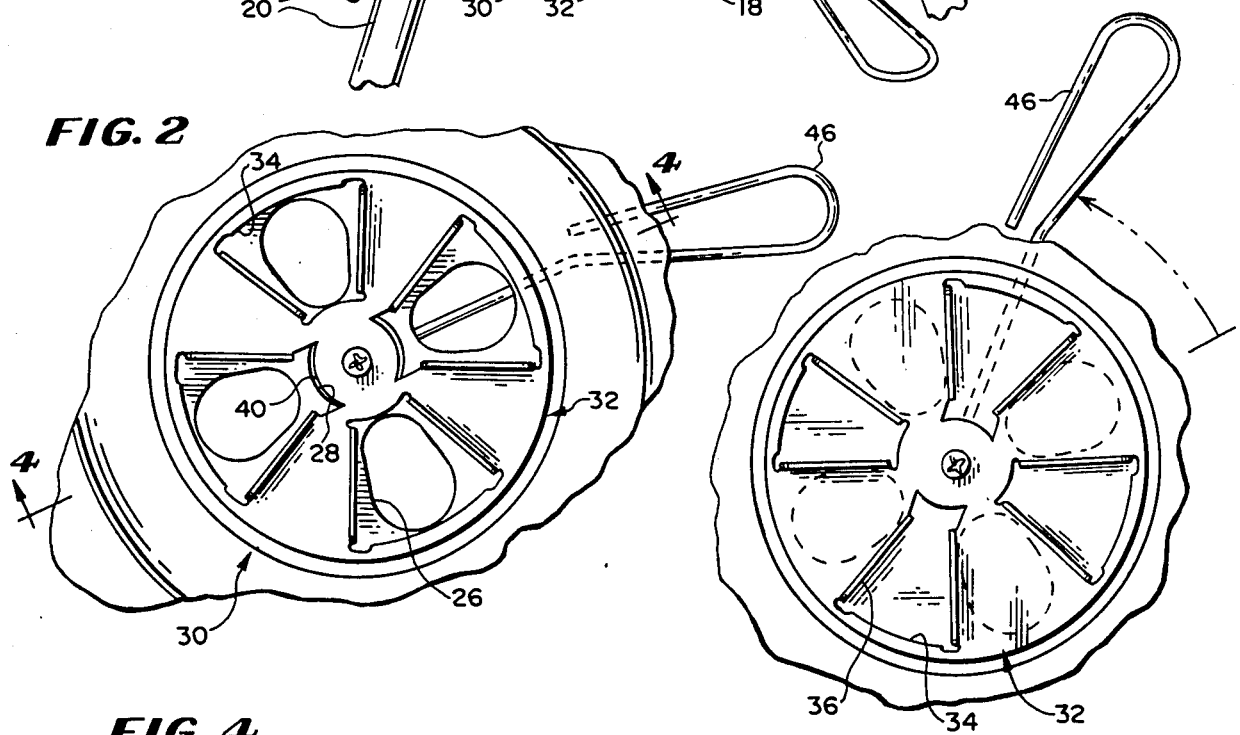
FIG. 2
FIG. 3
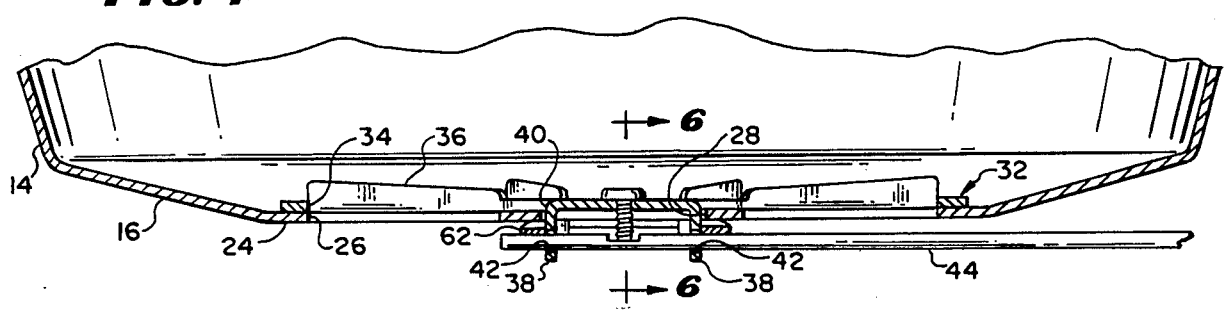
FIG. 4

BARBECUE GRILL DAMPER-ASH RAKE

TECHNICAL FIELD

This invention relates to barbecue grills and, more particularly, to dampers and ash rakes for barbecue grills.

BACKGROUND OF THE INVENTION

Barbecue grills of the type which employ a solid fuel, such as charcoal or the like, enjoy widespread use. In general, such barbecue grills comprise a receptacle or bowl which is frequently mounted on legs and wheels to render the same portable. The charcoal or other solid fuel may be placed directly on the receptacle bottom or, more commonly, on a wire grid positioned near the bottom of the receptacle. Another wire grid is removably positioned in the receptacle at its top for retaining the cooking food, and a cover having a top damper may be associated with the receptacle. For efficient control over the combustion rate of the charcoal, it is desirable to provide a damper in the bottom of the receptacle so that an air supply can flow upward through the burning coals. Thus, it is well known to provide damper means in the bottom wall of barbecue grill receptacles and other solid fuel firepots. However, prior barbecue grill dampers have been characterized by a variety of disadvantageous features, such as, high cost, excessive number of parts, difficulty of operation, accumulation of ash waste which hampers operation, difficulty of assembly, use limited to a particular shape of receptacle, and the like.

One form of prior of prior barbecue grill damper and ash rake designed specifically for the curved bottom wall of a hemispheroidal container is shown in U.S. Pat. No. 4,416,248. In that structure, there are three curved, V-shaped arms which must be telescoped in a particular order over a hexagonal center post in order to maintain the same in a particular radial orientation and provide close contact with the curved bottom wall of the receptacle. An operating handle is positioned through an aperture in the center post, a thumb screw is threaded into the center post and a friction washer is retained between the handle and the receptacle bottom to complete that damper assembly.

Other examples of barbecue grill dampers and ash rakes are shown in U.S. Pat. No. 3,667,448, which teaches a lower bowl compartment having a waste-receiving opening formed therein and a rotatable fuel-supporting grill having a depending scraper blade for scraping waste into the opening; and U.S. Pat. No. 3,126,881, which teaches an arcuate fuel-supporting plate rotatably mounted on the bottom of a barbecue bowl and having openings which may be aligned with openings in the bowl bottom to scrape expended coals and waste into a waste container positioned therebeneath, by rotating within fixed rods welded to the bowl bottom.

Various forms of grates positioned at the bottom of other solid fuel burning devices, such as stoves and furnaces, are shown in U.S. Pat. Nos. 744,082; 970,460; and 1,866,959.

The limitations and shortcomings of the representative types of dampers and ash rakes alluded to above, particularly as applied to barbecue grills, will be apparent to those skilled in the art.

SUMMARY OF THE INVENTION

The present invention provides a combination damper and ash rake for barbecue grills which alleviates or overcomes the shortcomings of the prior similar devices. The inventive damper-ash rake is of simple construction, employing a minimum number of parts, and capable of quick and easy assembly. At the same time, the invention is durable, easy operating and most efficient for the purposes intended.

Briefly, the invention comprises a flat disc adapted for positioning on a complementary flat bottom section of a barbecue grill receptacle, the said bottom section having a plurality of air holes formed therein. The disc has a corresponding plurality of openings formed therein and associated, upstanding rake projections struck from the disc.

A pair of ears is likewise struck from the disc, but in depending relationship, to provide a mounting hub therefor. The hub is positionable through a mounting opening formed in the receptacle bottom centrally of the air openings. A bent wire operating handle is positionable through a pair of opposed holes formed in the mounting hub ears and a resilient connector member forms a unified assembly of handle, hub and disc. A single screw bears against a flat in the operating handle to prevent inadvertent removal. Desirable tension and face-to-face contact of the disc with the flat bottom section of the receptacle is maintained by the novel interaction of the resilient connector member, handle and hub.

Numerous other advantages and features of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout the same, FIG. 1 is a fragmentary perspective view of a portable barbecue grill with a damper-ash rake embodying the principles of the invention incorporated therein;

FIG. 2 is a fragmentary top plan view of the damper-ash rake with the air vent holes in the fully open condition;

FIG. 3 is a similar view with the air vent holes in the fully closed condition;

FIG. 4 is an enlarged sectional view on the plane of line 4—4 in FIG. 2;

DETAILED DESCRIPTION OF THE INVENTION

Figure 5:
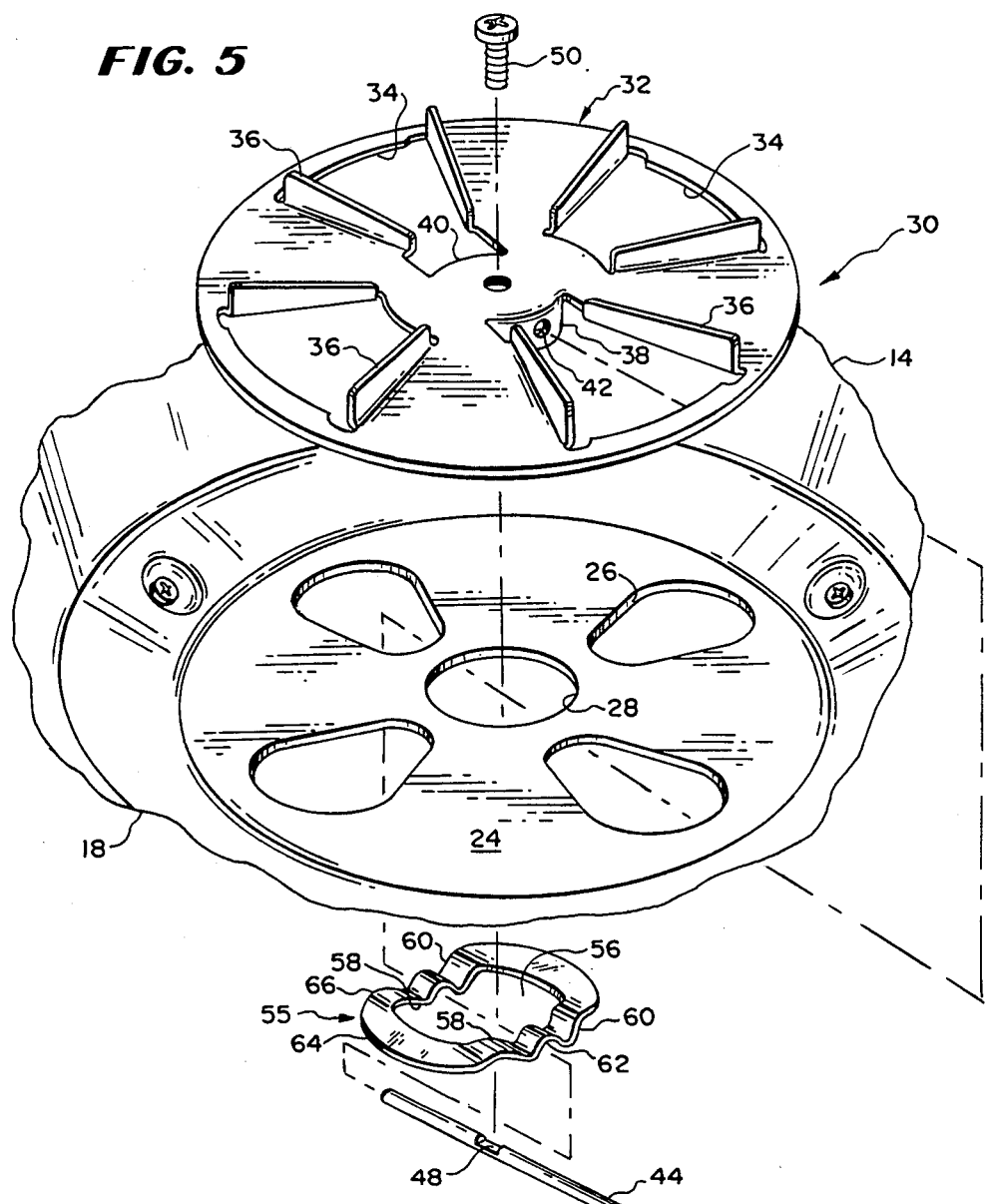
FIG. 5 is an exploded perspective view of the elements of the damper-ash rake assembly.

Referring now in greater detail to the various Figures of the drawings, it will be seen that the reference numeral 10 indicates generally a portable barbecue grill of the type with which the invention may be associated. Grill 10 comprises a lower container or receptacle 12 having a tapering side wall 14 and a top shoulder 16 adapted to support a food grid and a cover (not shown). The receptacle 12 comprises further a bottom wall 18 to which may be connected conventional legs 20 for supporting the grill. A fuel grid 22 is removably supportable by the receptacle side wall for holding the burning fuel, such as the charcoal briquets F illustrated. A bowl or trap (not shown) for receiving raked ashes and waste materials may also be mounted on the legs 20 in conventional manner.

Bottom wall 18 of the receptacle 12 is provided with a central flat or planar section 24 (see FIGS. 4, 5 and 6), and said planar section has formed therein a plurality of vent openings 26, and a central mounting opening 28. A damper-ash rake embodying the principles of the invention, indicated generally by the reference numeral 30, is associated with the bottom wall planar section 24.

Damper-ash rake 30 comprises an integrally formed planar disc 32 having a plurality of damper openings 34 formed therein and upstanding, radial rake projections 36 struck from said disc adjacent the damper openings 34. A pair of depending ears 38, 38, is struck downwardly from a central portion of the disc 32. The ears 38 are arcuate in configuration and, together, define a substantially circular mounting hub 40 of slightly smaller diameter than, and adapted to rotatably fit through, the mounting opening 28 formed in the receptacle planar section 24. It will thus be appreciated that the disc 32 is rotatably mounted in face-to-face contact with the receptacle planar section 24 when the depending ears 38 are positioned through the opening 28 formed in said section.

Figure 6:
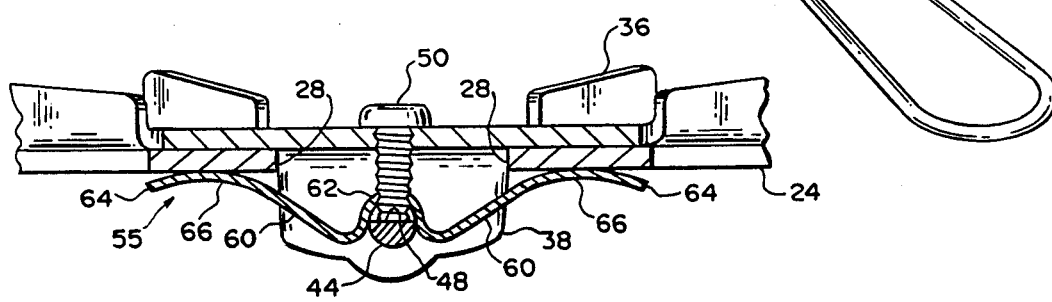
FIG. 6 is a fragmentary sectional view on the plane of line 6—6 in FIG. 4.

The ears 38 are provided with opposed holes 42, 42, and said holes are adapted to accommodate therethrough the shaft 44 of a bent-wire handle member 46 (see FIGS. 4, 5 and 6). The handle shaft 44 comprises a flat 48 and said flat is engageable by a mounting screw 50 operationally positioned in a threaded hole tapped through the center of the disc 32 for locking the handle 46 in assembled relationship.

A resilient connector member 55 completes the operational assembly of the damper-ash rake 30. The connector member 55 comprises an integral, complex-bent, spring steel member which, in plan (see FIG. 5) comprises an enlarged central opening 56 having curved ends 58, 58, adapted to loosely accommodate the mounting hub ears 38 therethrough. In vertical section (see FIG. 6), the member 55 comprises a batwing-like form having a pair of main segments 60, 60, extending upwardly from an arched center 62, and free tip segments 64, 64, downwardly bent as at 66, 66.

In assembling the damper-ash rake 30, the ears 38 are inserted down through the planar section opening 28 and the member 55 is positioned over said ears. In this condition, the ear holes 42 are partially blocked by the arched centers 62 of the member 55. In order to insert the handle shaft 44 through the holes 42, it is required to urge the centers 62 upwardly against the normal resilient bias of the member 55. Once the handle shaft 44 is operationally inserted, release of the member 55 causes said shaft to be further spring-gripped by the arched centers 62. The mounting screw 50 is then screwed into engagement with the handle flat 48 to lock the assembly in place.

When the damper-ash rake 30 is operationally assembled as illustrated and described, the member 55 provides a spring-urged bias to the handle 46 a disc 32. As a result, the disc 32 is retained in close face-to-face contact with the bottom wall planar section 24 to prevent accumulation therebetween of ashes, dripped food particles, and the like. Rotation and operation of the disc 32 for air damping and/or ash raking functions is nonetheless readily achievable. It will also be noted that operation and rotation of the disc 32 results in minimal scratching damage to the outer surface of the receptacle bottom because of the spring action of the member 55 and the low-friction contact of the member's curved bends 66.

It will be readily noted from the foregoing detailed description of the invention and illustrative embodiment thereof that numerous variations and modifications may be effected by those skilled in the art without departing from the true spirit and scope of the novel concept of the principles of the invention. It should also be understood that orientation phrases, such as, "upwardly" and "downwardly" have been employed solely for ease of description and are not intended to be limiting in any way of the scope of the invention.

What is claimed is:

1. A barbecue grill comprising:
    an open-topped receptacle having a planar section in a bottom wall thereof, said planar section having a plurality of vent openings and a central mounting opening formed therein;
    a flat disc rotatably mounted on said planar section in face-to-face contact therewith, said disc having a plurality of damper openings formed therein operationally cooperable with said vent openings;
    central hub means depending from said disc rotatably mounted in said mounting opening, said hub means comprising a pair of ears integrally struck from said disc;
    handle means mounted from said hub means beneath said planar section for selectively rotating said disc, said handle means comprising an elongated shaft, said ears being formed with a pair of opposed holes, said shaft being mounted through said holes; and
    resilient means between said planar section and handle means normally urging said disc into intimate contact with said planar section, said resilient means comprising a bent spring steel metal member having a central opening accommodating said hub ears therethrough, said member engaging said shaft to normally urge said shaft away from said planar section.

2. A barbecue grill according to claim 1 wherein said metal member comprises a batwing-like form having a pair of opposed arched center segments, said center segments being operationally aligned with the holes in said ears and in engagement with said shaft.

3. A barbecue grill according to claim 2 wherein said metal member comprises main segments bent upwardly from said center segments and free tip segments return bent from said main segments, said free tip segments operationally engaging said planar section.

4. In a barbecue grill having an open-topped receptacle, a combination damper-ash rake comprising:
    a substantially circular planar section in a bottom wall of the receptacle, said planar section having a plurality of vent openings and a central mounting opening formed therein;
    a circular flat disc operationally positioned on said planar section, said disc having a plurality of radially spaced damper openings formed therein cooperable with said vent openings;
    rake members integrally struck upwardly from said disc in association with said damper openings;
    central hub means integrally struck downwardly from said disc and rotatably mounted in said mounting opening, said hub means comprising a pair of diametrically opposed ears integrally struck downwardly from said disc, said ears being formed with a pair of opposed holes;

handle means mounted from said hub means beneath said planar section for selectively rotating said disc, said handle means being mounted from said holes;

a resilient means associated with said handle means for normally urging said disc into intimate contact with said planar section, said resilient means comprising a bent spring steel metal member operationally positioned around said hub ears, said metal member comprising a batwing-like form having a pair of opposed center segments, said center segments being operationally aligned with said opposed holes and in engagement with said handle means to normally urge said handle means away from said planar section.

5. In a barbecue grill according to claim 4, said handle means comprising a shaft having a flat operationally positioned between said hub ears, and a screw threaded through a central hole in said disc bearing against said flat to lock said handle in operationally assemble position.

* * * * *